United States Patent Office 3,282,542
Patented Nov. 1, 1966

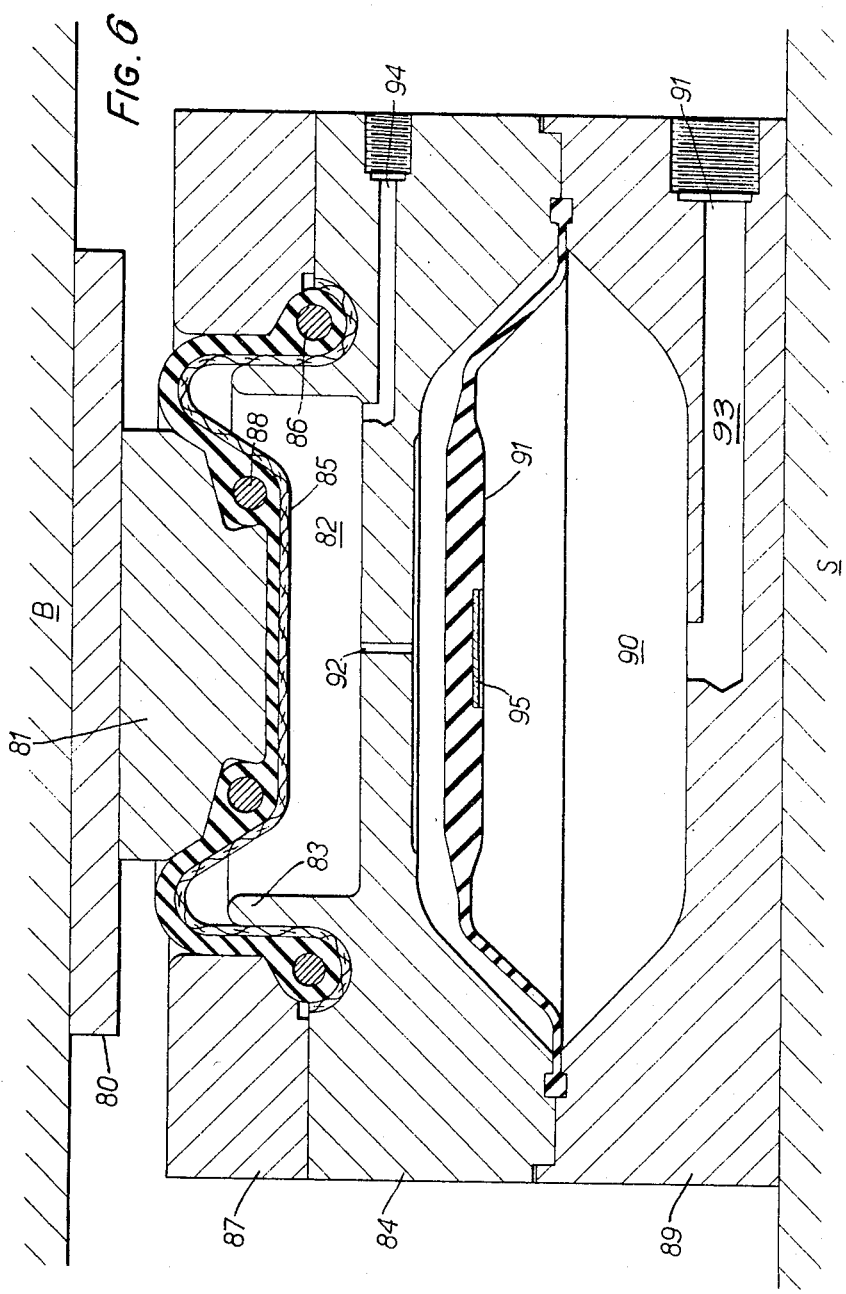

3,282,542
ANTI-VIBRATION MOUNTING
Aubrey John Hutchinson Goodwin, Shandon, Michael Carl Hartnell-Beavis, Drymen, and Myles Gordon Ogilvie, Bearsden, Scotland, assignors to Yarrow and Company Limited, Glasgow, Scotland, a British company
Filed July 9, 1964, Ser. No. 381,393
Claims priority, application Great Britain, July 12, 1963, 27,827/63
16 Claims. (Cl. 248—9)

This invention relates to anti-vibration mountings, that is to say, to mountings for isolating from a support a periodic force applied to a body while at the same time transmitting to the support a constant force applied to the body.

Throughout the specification, the term "periodic force" is used to mean a force or a component of a force that varies periodically with respect to time, the term "constant force" is used to mean either a force that remains substantially constant over a single period of the periodic force or a component of a force, which component remains substantially constant over a single period of the periodic force, and the term "isolating" is used to include both not transmitting at all and transmitting with attenuation.

The body may be, for example, a machine and the anti-vibration mounting might be arranged to isolate from the support periodic forces arising from the operation of the machine while at the same time supporting the machine by transmitting the weight of the machine to the support.

This invention provides an anti-vibration mounting which comprises a variable-volume gas-filled vessel arranged to be interposed between a body and a support, control valve means arranged to be responsive to variations in the position of the body relative to the support, means for supplying fluid under pressure to the control valve means, means for allowing fluid to escape from the control valve means, conduit means providing communication between the control valve means and the variable-volume vessel, an isolating element situated in the conduit means and arranged to impede but not prevent the flow of gas to and from the variable-volume vessel, which isolating element comprises an orifice arranged in series with a chamber, the orifice being situated between the chamber and the variable-volume vessel, the effective stiffness of the isolating-element chamber (as hereinafter defined) being at least one fifth of the effective stiffness of the variable-volume vessel (as hereinafter defined), and the effective cross-sectional area of the isolating-element chamber being at least one hundred times that of the orifice, any liquid in the conduit means being separated from the gas in the variable-volume vessel by a flexible and/or movable barrier situated in the conduit means between the control valve means and the isolating element orifice, the arrangement being such that, in operation, a displacement of the body relative to the support which causes the variable-volume vessel to assume a volume smaller than an intermediate volume or range of volumes so operates the control valve means as to cause fluid to flow from the fluid supply means through the conduit means towards the isolating element, and displacement of the body relative to the support which causes the variable-volume vessel to assume a volume larger than the intermediate volume or range of volumes so operates the control valve means to allow fluid to escape from the conduit means through the fluid escape means, and the sensitivity of the control valve means (as hereinafter defined) is so arranged to vary with varying degrees of opening of the control valve means that the ratio of the sensitivity of the control valve means to the impedance of the isolating element is maintained at a value below the critical value at which instability occurs.

The term "effective stiffness of the isolating element" is used to mean the ratio of the product of the square of the cross-sectional area of the variable-volume vessel transverse to the axis of fluid flow and the adiabatic bulk modulus of the gas in the isolating element chamber to the volume of gas in the isolating element chamber. The term "effective stiffness of the variable-volume vessel" is used to mean the ratio of the product of the square of the cross-sectional area of the variable-volume vessel transverse to its axis of contraction and expansion and the adiabatic bulk modulus of the gas contained in the vessel to the volume of gas in the vessel.

Several forms of anti-vibration mounting suitable for mounting the prime mover of the propulsion unit for a vessel and constructed in accordance with the invention will now be described by way of example in greater detail with reference to the accompanying drawings in which:

FIG. 6 is a vertical section through a part of a fourth form of anti-vibration mounting.

Figure 1:
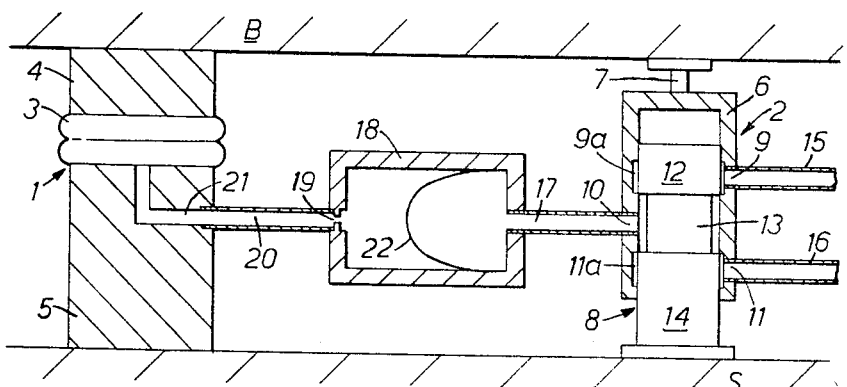
FIG. 1 is a diagrammatic vertical section of one form of anti-vibration mounting.

Referring to FIG. 1 of the accompanying drawings, the first form of anti-vibration mounting comprises a pneumatic mount, which is indicated generally by the reference numeral 1, and a control valve, which is indicated generally by the reference numeral 2. In operation, the pneumatic mount 1 and the control valve 2 are interposed between a body B to be mounted and a support S.

The pneumatic mount 1 comprises a flexible bellows 3, which contains a gas and may be made of rubber or metal, interposed between upper and lower rigid members 4 and 5, respectively.

The control valve 2 is a spool-type valve and consists of a cylindrical valve chamber 6, which is closed at the top and is rigidly connected to the body B by a connecting member 7, and a spool, which is indicated generally by the reference numeral 8. The valve chamber 6 has a supply port 9, which leads into an annular groove $9a$ formed in the wall of the chamber, an output port 10 and an exhaust port 11 which leads into an annular groove $11a$ formed in the wall of the chamber. The spool 8 is made up of an upper portion 12, which serves to seal off the annular groove $9a$, an intermediate portion 13 of reduced diameter (see FIG. 2) and a lower portion 14, which serves to seal off the annular groove $11a$ and is secured to the support S. The length of the intermediate portion 13 of the spool 8 is slightly less than the separation between the inner edges of the annular grooves $9a$ and $11a$ so that there exists a range of positions of the spool 8 for which the annular grooves $9a$ and $11a$ are completely covered. The distance that the spool 8 has to move from its central position in order to provide access to one or other of the annular grooves $9a$ and $11a$ is referred to as the valve overlap and is considered positive (in contradistinction to the case of a valve in which there exists a range of positions of the spool that gives access to both the annular grooves).

When one of the grooves 9a and 11a is uncovered, the associated port 9 or 11, respectively is placed in communication with the output port 10 through the annular region surrounding the intermediate portion 13.

A supply pipe 15 leads from a suitable pump unit, which is not shown and which should be arranged to supply liquid at a suitable substantially constant pressure, to the supply port 9. An exhaust pipe 16 leads from the exhaust port 11 to a liquid reservoir (not shown) from which the pump draws liquid.

From the output port 10, a pipe 17 leads to an opening in one end wall of a cylindrical isolating chamber 18. In the other end wall of the chamber 18 there is a small orifice 19 from which a pipe 20 leads to a bore 21 that is formed in the lower rigid member 5 and communicates with the interior of the bellows 3. Thus, the control valve 2 is in communication with the bellows 3 through a conduit (made up of the pipes 17 and 20 and the bore 21) in which there is situated an isolating element made up of the isolating chamber 18 and the orifice 19.

The liquid that is supplied to the control valve 2 is separated from the gas in the bellows 3 by means of a flexible bag 22 which is secured within the isolating chamber 18.

Under normal operating conditions the force due to pressure in the pneumatic mount 1 counterbalances the force due to gravity acting on the supported body B. The quantity of air in the pneumatic mount 1, the isolating chamber 18 and the associated connecting pipe 20, is chosen such that under these conditions the flexible bag 22 divides the isolating chamber into approximately equal portions, the one containing air, the other liquid.

As an example, the dimensions of the chamber 18 and the orifice 19 may be chosen such that the effective stiffness of the air volume in the chamber 18 is approximately equal to the effective stiffness of the pneumatic mount 1, and the chamber cross-sectional area in a direction transverse to the direction of fluid flow therethrough may be approximately one thousand times that of the orifice.

The mounting operates in the following manner. The impedance of the isolating element consisting of the isolating chamber 18 and the orifice 19 effectively isolates the liquid in the system from the high-frequency pressure fluctuations that occur in the gas as a result of the periodic force applied to the body B. Thus, in response to the periodic force, the pneumatic mount 1 behaves substantially like a simple conventional vibration isolator and, by a suitable choice of dimensions, it is possible to arrange that the pneumatic mount 1, considered as a simple conventional vibration isolator, has a sufficiently low static stiffness to ensure that the required attenuation of the periodic force is achieved.

In the absence of any variation in the constant force applied to the body B, the setting of the control valve 2 remains such that the output port 10 is not in communication with either the supply port 9 or the exhaust port 11.

If the constant force tending to urge the body B towards the support S increases, however, so that the body B moves downwardly this causes the valve chamber 6 to move downwardly and, when the upper portion 12 of the spool 8 uncovers a part of the annular groove 9a, liquid flows through the valve chamber 6 from the supply port 9 to the output port 10. This causes liquid to flow along the pipe 10 and into the isolating chamber 18, which leads to an increase in the pressure of the gas in the isolating chamber 18 and so causes gas to flow into the bellows 3. This continues until the pressure of the gas in the bellows 3 reaches a sufficiently high value to move the body B upwardly relative to the support S to an extent sufficient to cause the control valve 2 to close again.

If the constant force tending to urge the body B towards the support S decreases, so that the body B moves upwardly sufficiently far to cause the lower portion 14 of the spool 8 to move a part of the annular groove 11a, then the output port 10 is brought into communication with the exhaust port 11 with the result that liquid flows through the valve chamber 6 from the output port 10 to the exhaust port 11. This causes the quantity of liquid in the isolating chamber 18 to decrease with the result that some gas flows out of the bellows 3. This continues until the pressure of the gas in the bellows 3 falls sufficiently to cause the body B to move downwardly to the point when the control valve 2 closes again.

The force acting on the body B in this form and the other three forms of anti-vibration mounting according to the invention can be resolved into components that are in phase and antiphase with the displacement of the body B relative to the support S and components that are in phase and antiphase with the velocity of the body relative to the support S. The lowest frequency at which the amplitude of the algebraic sum of the components that are in phase and antiphase with the displacement of the body B is equal to zero is hereinafter referred to as the resonant frequency.

An approximate criterion for stable operation is that, at the resonant frequency, the amplitude of the sum of the components of the forces acting on the body B that are in phase with the velocity of the body must not exceed the amplitude of the sum of the components of the forces acting on the body B that are 180° out of phase with the velocity of the body B. This criterion is satisfied as long as the ratio $N/R$, where N is the sensitivity of the valve (which is a measure of the average amount of fluid passed by the valve in either direction) and R is the impedance of the isolating element formed by the combination of the isolating chamber and the orifice, remains below a critical value fixed by the constants of the system.

The value of R depends on the ratio of the effective stiffness of the chamber 18 to the effective stiffness of the variable-volume vessel 3 and, at small amplitude of oscillation of the body B, it is directly proportional to the square root of the amplitude of oscillation of the body B. If the sensitivity of the control valve 2 also decreases with decreasing amplitude, stable operation can be achieved without unduly restricting the sensitivity of the control valve 2 at large amplitudes. The presence of positive overlap in the valve 2 ensures that its sensitivity does decrease in this manner, the sensitivity decreasing with decreasing amplitude until it reaches zero when the amplitude equals the overlap. The amount of overlap required for a given rate of increase of sensitivity with amplitude can be reduced if the ports are shaped. This is especially the case with a liquid. It is therefore possible to arrange that, despite variations in the constant force applied to the body B, the position of the body B relative to the support S remains constant to within narrow limits, so that the mounting has a very high static stiffness.

Since the value of R increases with amplitude, a high value is associated with the relatively large movements which might occur if the body B were to be excited by exterior forces at the natural frequency. This high value of R gives rise to a force opposing the motion and tends to limit the amplitude of the movement. The damping obtained in this manner is generally much greater than that obtained by a conventional resilient mounting.

As the frequency of the periodic force applied to the body B increases above the natural frequency, the impedance of the isolating element becomes large, and the pneumatic mount tends to behave substantially like the simple conventional anti-vibration mounting that would result if the orifice in the isolating element were to be closed. Satisfactory attenuation of the periodic force at high frequencies can thus readily be achieved. Because the inertia reaction of the body B is proportional to the square of the frequency and to the displacement of the body, the amplitude of oscillation of the body B in response to high frequency periodic forces is extremely small and the movement of the body B does not materially cause the operation of the control valve 2.

Figure 3:
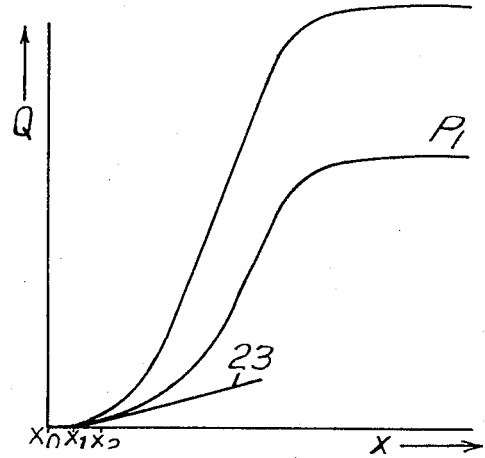
FIG. 3 is a graph relating to the control valve shown in FIG. 2.

In FIG. 3 of the drawings, the rate of flow of liquid through the output port 10 (Q) is shown as a function of the separation ($x$) between the body B and the support S for values of $x$ greater than or equal to $x_0$, which is the value of $x$ for which the spool 8 is in its central position. It is assumed that there is no leakage of liquid through the control valve 2 when the control valve is closed and the form of $Q(x)$ is shown for two different pressures $P_1$ and $P_2$ ($P_2 > P_1$) of the liquid in the pipe 15 (assuming a constant pressure in the output port), $x_1$ is the separation between the body B and the support S at which the lower portion 14 of the spool 8 starts to uncover the annular groove 11a associated with the exhaust port 11.

The control valve should be formed to have a sensitivity which increases in such a manner that at the supply pressure chosen the value of $N/R$ remains below the critical value referred to above at least for all amplitudes of movement of the body relative to the support to which it is likely to be subjected.

The second form of anti-vibration mounting is entirely pneumatic and is suitable for locating a body B in a horizontal direction relatively to a support S even though the mean value of the constant force that the mounting has to transmit from the body B to the support S is zero.

Figure 4:
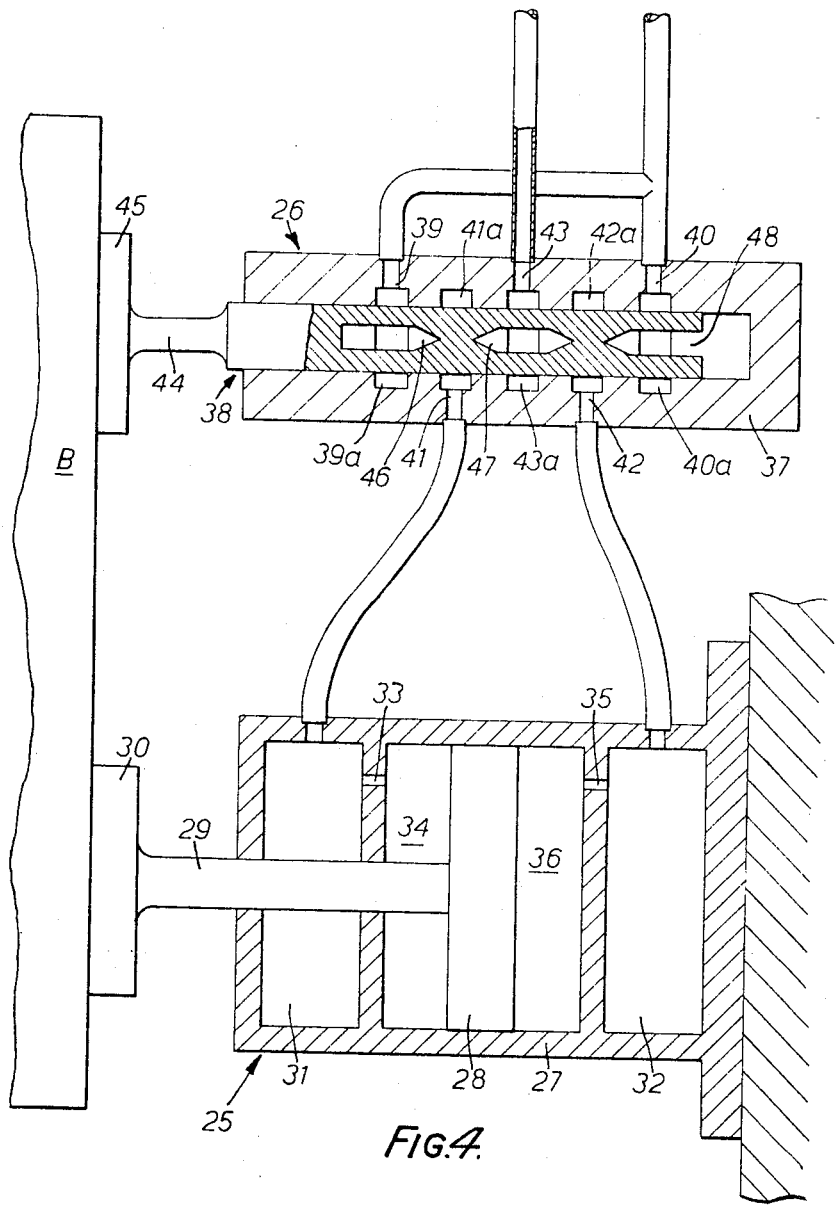
FIG. 4 is a diagrammatic vertical section of a second form of anti-vibration mounting.

Referring to FIG. 4 of the drawings, the second form of anti-vibration mounting comprises a pneumatic mount, which is indicated generally by the reference numeral 25 and a control valve, which is indicated generally by the reference numeral 26.

The pneumatic mount 25 comprises a cylinder 27 within which there is slidably mounted a piston 28 which is connected by a piston rod 29 and a plate 30 to the body B. Beyond the end walls of the cylinder 27 are two rigid cylindrical isolating chambers 31 and 32. An orifice 33 formed in the end wall of the cylinder 27 towards the body B provides the sole means of communication between the isolating chamber 31 and the interior of the cylinder 27 on one side of the piston 28 (which constitutes a variable-volume vessel 34), and, together, with the isolating chamber 31, forms an isolating element. An orifice 35 formed in the end wall of the cylinder 27 towards the support S, to which the isolating chamber 32 is secured provides the sole means of communication between the isolating chamber 32 and the interior of the cylinder 27 on the side of the piston 28 towards the support S (which constitutes a second variable-volume vessel 36) and, together with the isolating chamber 32, forms a second isolating element.

The control valve 26 is a spool-type valve and comprises a generally cylindrical valve chamber 37, which is rigidly secured to the support S (by means which is not shown) and within which there is slidably mounted a spool, which is indicated generally by the reference numeral 38.

The valve chamber 37 is formed with two exhaust ports 39 and 40, which lead into annular grooves 39a and 40a, respectively, two output ports 41 and 42, which lead into annular grooves 41a and 42a, respectively, and a supply port 43, which leads into an annular groove 43a.

The spool 38 is rigidly secured to the body B by means of a spindle 44 and plate 45, and is formed with three slots 46, 47 and 48, of which the operative end portions are of triangular profile. This shaping allows the sensitivity to increase only at the desired rate for a smaller amount of overlap than would be the case with a valve in which the full width of the ports is uncovered immediately. When the spool 38 is in its central position none of the ports 39–43 is in communication with any other of those ports. If, however, as a result of a decrease in a constant force which normally tends to urge the body B towards the support S (or of an increase in a constant force which normally tends to urge the body B away from the support S), the body B moves away from the support S through a distance greater than the valve overlap (which may be zero), the exhaust port 40 is brought into communication with the output port 42 through the slot 48 and the output port 41 is brought into communication with the supply port 43 through the slot 47. If the body B moves (from a position in which the spool 31 is in its central position) towards the support S through a distance greater than the valve overlap, the supply port 43 is brought into communication with the output port 42 through the slot 47 and the output port 41 is brought into communication with the exhaust port 39 through the slot 46.

Means (not shown) for supplying a gas under pressure, for example, a compressor for supplying compressed air, is connected to the supply port 43 by a supply pipe 44 and a branched exhaust pipe 45 leads from the exhaust ports 39 and 40. A pipe 96 provides communication between the output port 41 and the isolating chamber 31, and a pipe 97 provides communication between the output port 42 and the isolating chamber 32.

Under normal operating conditions the piston 28 divides the chamber formed by variable volumes 34 and 36 such that variable volumes 34 and 36 are approximately equal.

As an example, the dimensions of the isolating chambers 31 and 32 and of the orifices 33 and 35 may be chosen such that the effective stiffness of the gas in these chambers is approximately equal to that of the effective stiffness of the gas in the variable volumes 34 and 36 respectively and the chamber cross-sectional areas in the direction transverse to the direction of fluid flow therethrough may be approximately one thousand times those of the orifices 33 and 35 respectively.

The second form of anti-vibration mounting operates in the following manner. In response to high-frequency periodic forces the pneumatic mount 25 behaves like a simple conventional anti-vibration mounting, but changes in the constant force acting horizontally on the body B towards or away from the support S that cause the mean position of the body B relative to the support S to be displaced by a distance greater than the valve overlap bring the control valve 26 into operation. Thus, when the mean position of the body B (relative to the oscillations that it performs in response to the periodic force) is displaced towards the support S, the control valve 26 operates to increase the gas pressure within the variable-volume vessel 36 and to decrease the gas pressure within the variable-volume vessel 34 until the body B is restored to its mean position (plus or minus the valve overlap). Similarly, when the mean position of the body B is displaced away from the support S, the control valve 26 operates to increase the gas pressure in the variable-volume vessel 34 and to decrease the gas pressure in the variable-volume vessel 36 until the body B is restored to its means position (plus or minus the valve overlap).

Figure 2:
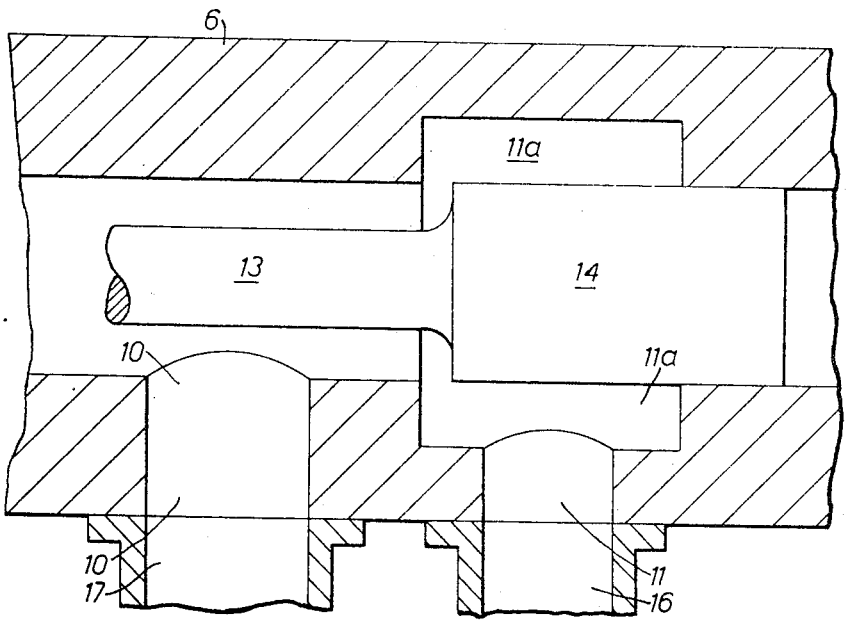
FIG. 2 is an axial section of a part of the control valve of the mounting shown diagrammatically in FIG. 1.
Figure 5:
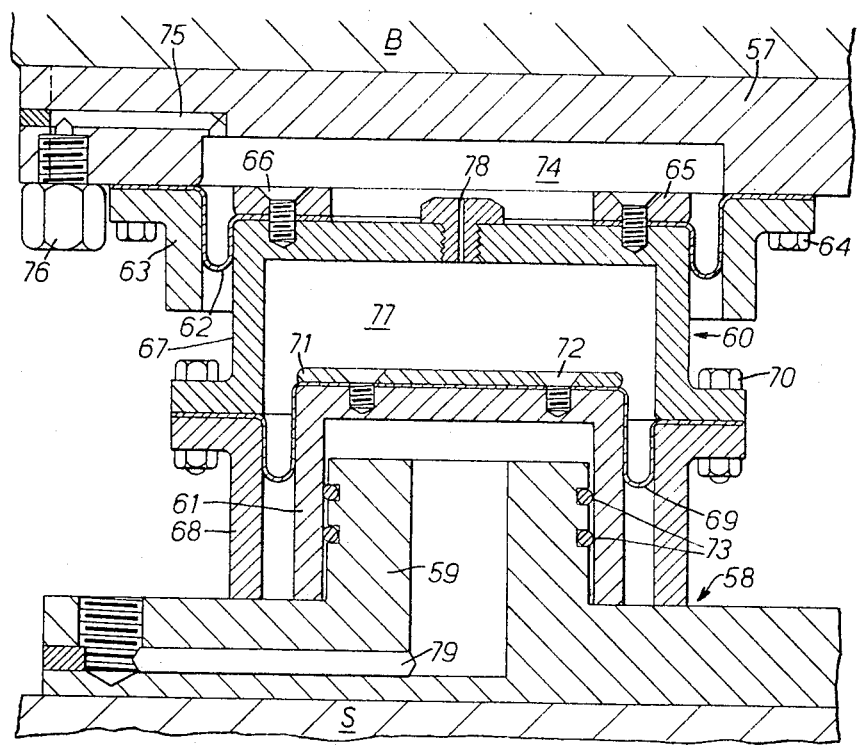
FIG. 5 is a vertical section through a part of a third form of anti-vibration mounting.

The third form of anti-vibration mounting comprises a pneumatic mount, which is shown in FIG. 5 of the drawings and a control valve (not shown in FIG. 5) which is the same as the control valve 2 shown in FIG. 2. The isolating element is included in the pneumatic mount.

Referring to FIG. 5, a pneumatic mount, which is shown interposed between a body B and a support S, comprises an upper end-piece 57, which is secured to the body B and which is formed with a cylindrical recess in its underside, and a lower end-piece, which is indicated generally by the reference numeral 58 and which is formed with a central upstanding cylindrical portion 59. Between the end-pieces 57 and 58 are an outer hollow cylindrical member, which is indicated generally by the reference numeral 60 and is open at its lower end and an inner hollow cylindrical member 61, which is also open at its lower end.

The outer hollow cylindrical member 60 is secured to the upper end-piece 57 by means of an annular flexible diaphragm 62 (made, for example, of rubber). The outer edge portion of the diaphragm 62 is clamped between the underside of the upper end-piece 57 and an annular flange 63, which is secured by screws 64 to the upper end-piece 57, and the inner edge portion of the diaphragm 62 is clamped between the top of the outer hollow cylindrical member 60 and a ring 65, which is secured to the member 60 by screws 66.

The outer hollow cylindrical member 60 is split horizontally to form an upper portion 67 and a lower portion 68. Where the upper and lower portions 67 and 68, respectively, abut one another, they are formed with outwardly extending annular flanges between which is clamped the outer edge portion of a circular flexible diaphragm 69 (made, for example, of rubber) and which are secured together by screws 70. The inner portion of the flexible diaphragm 68 is clamped between the top of the inner hollow cylindrical member 61 and a plate 71 which is secured to the member 61 by screws 72.

The inner hollow cylindrical member 61 makes a sliding fit with the upstanding cylindrical portion 59 of the lower end-piece 58 and a sliding seal is provided by two sealing rings 73.

The upper end-piece 57, the outer hollow cylindrical member 60 and the flexible diaphragm 62 together form a variable-volume vessel 74 into which a gas can be introduced under pressure through a bore 75, which is formed in the upper end-piece 57 and is closed by a screw plug 76.

The outer hollow cylindrical member 60 rests on the lower end-piece 58 and they together form an isolating chamber 77, which is in communication with the variable-volume vessel 74 through an orifice 78 in the top of the member 60 and is in communication with the control valve (not shown) through a bore 79 and in the lower end-piece 58. The control valve supplies liquid to the space inside the hollow cylindrical member 61. The isolating chamber 77 and the orifice 78 together constitute an isolating element. The inner hollow cylindrical member 61 and the flexible diaphragm 69 together form a flexible and movable barrier which separates the gas in the isolating chamber 77 from the liquid therein.

Upon relative movement between the members to which they are secured, the diaphragms 62 and 69 execute rolling movements.

Under normal operating conditions, the force due to the pressure in the variable-volume vessel 74 counterbalances the force due to gravity acting on the supported body B. The quantity of air in the vessel 74 and the isolating chamber 72, is chosen such that under these conditions the inner hollow cylindrical member 61 is approximately at the mid-point of its track.

As an example, the dimensions of the isolating chamber 77 and the orifice 78 may be chosen such that the effective stiffness of the air balance in the isolating chamber 77 is approximately equal to the effective stiffness of the air volume in the variable-volume vessel 74 and the chamber cross-sectional area in a direction transverse to the direction of fluid flow therethrough may be approximately one thousand times that of the orifice 78.

The manner in which the third form of anti-vibration mounting operates is analogous to the manner of operation of the first form of anti-vibration mounting. Because of the decrease in cross-sectional area between the variable-volume vessel 74 and the gas-filled portion of the isolating chamber 77 and the further decrease between the gas-filled and liquid-filled portion of the isolating chamber 77, the outer hollow cylindrical member 60 is normally maintained in firm contact with the lower end-piece 58. Thus, the behaviour of the variable-volume vessel 74 is analogous to that of the bellows 3 shown in FIG. 1.

The third form of anti-vibration mounting has the advantage that, if the gas should leak out of the variable-volume vessel 74, the inner hollow cylindrical member 61 will gradually rise until the plate 71 eventually abuts the underside of the top of the member 60, while the ring 65 abuts the upper end-piece 57, and thereafter the mounting will function as an entirely hydraulic mounting. This will give a much less favourable vibration attenuation, but the body B will remain correctly positioned with respect to the support S. It is, of course, important that the length of the member 61 should be sufficient to allow the mounting to operate in this manner.

The fourth form of anti-vibration mounting comprises a pneumatic mount, which is shown in FIGURE 6 of the drawings, and a control valve (not shown in FIGURE 6) which is the same as the control valve 2 shown in FIGURE 2.

Referring to FIGURE 6, the pneumatic mount is shown interposed between a body B and a support S. The mount has a top-plate 80 on which the body B rests and to which is attached a projection 81. The projection 81 extends into a cylindrical cavity 82 formed by a tubular extension 83 of a member 84. The cavity 82 is closed by a flexible diaphragm 85 formed, for example, of a layer of rubber backed with a layer of fabric which passes over the extension 83. A ring 86 is embedded in the outer edge of the diaphragm 85 and is held between the number 84 and an annular member 87 which is attached to the member 81. The diaphragm 85 has a central flat portion surrounded by a second ring 88 embedded in the diaphragm 85, and the ring 88 fits into a groove in the side of the extension 81 so that the resulting deformation of the material of the neighbourhood of the ring 88 holds the central flat portion of the diaphragm 85 securely against the flat undersurface of the extension 81. The region between the two rings 86 and 88 flexes on relative motion between the extension 81 and the member 84 to execute a rolling motion, and the cavity 82 thus forms a variable-volume vessel.

As an example of suitable materials, the diaphragm 85 may be constructed of oil-resistant rubber reinforced by layers of nylon fabric. These layers may be wrapped around the rings 86 and 87, which may be constructed of steel.

The member 84 is formed with a recess in its lower surface. A corresponding recess is formed in the upper surface of a base plate 89 on which the member 84 rests, and the two recesses together form a discoid cavity 90. A flexible membrane 91 is clamped between the member 84 and the base plate 89, and divides the cavity 90 into two. The cavity 90 forms an isolating chamber which communicates with the variable-volume vessel 82 through an orifice 92 formed in the member 84. The orifice 92 opens directly into the vessel 82. A conduit 93 opens into the lower part of the cavity 90, and also communicates with the control valve (not shown), which supplies liquid to the lower part of the cavity 90. A supply conduit 94 formed in the member 84 supplies an initial charge of air to the variable-volume vessel 82. A metal insert 95 embedded in the flexible membrane 91 protects the membrane in the event of it being forced against the mouth of the conduit 93 (for example if the supply of liquid to the control valve fails).

As an example of suitable materials, the membrane 91 may be constructed of oil-resistant rubber, and the liquid supplied by the control valve may be oil.

The manner of operation of the fourth form of anti-vibration mounting is similar to that of the first form. This form may also be adapted for use when the control valve supplies a gas. In this case, the membrane 91 should be omitted. There will also no longer be any need to use the supply conduit 94 to charge the variable-volume vessel.

The inherent stiffness of the variable-volume vessel itself should be as low as possible, so that as high a proportion as possible of the stiffness of the vessel results from the gas in the vessel. In general, it is possible to arrange that the inherent stiffness of the variable-volume vessel does not contribute more than 10–15% of the total stiffness of the pneumatic mount considered as a single conventional vibration isolator, but figures as high as 25% would prove satisfactory for some applications and even 50% or more might be tolerable in some cases.

The stiffness of the mounting at high frequencies depends upon two factors. First, the stiffness depends upon the volume of gas in the mounting (excluding any gas that is separated from the variable-volume vessel by the orifice of the isolating element), the stiffness decreasing as the volume of gas increases. Secondly, the stiffness depends upon the change in volume of the variable-volume vessel produced by a given displacement of the body, the stiffness decreasing as the change in volume produced by a given displacement decreases. Thus, for example, when the variable-volume vessel comprises a bellows, the stiffness decreases as the effective cross-sectional area of the bellows decreases.

An important application of anti-vibration mountings is for mounting the engines of vehicles and vessels. In this case, in addition to periodic forces arising from the operation of the engine and the constant force arising from the weight of the engine, forces can arise from the movement of the vehicle or vessel, (especially, in the case of a vessel, from the rolling of the vessel), from the torque reaction of the engine and from unbalanced pressure pipe connections. These latter forces usually do not vary significantly over a single period of the periodic force and so their effect is to add to the constant force arising from the weight of the engine, with the result that the total constant force that the anti-vibration mounting must be able to transmit is increased. Also, such forces may act laterally, or have components which act laterally, and anti-vibration mountings may be used to support the engine laterally as well as vertically.

The mountings may be members of an assembly of anti-vibration mountings having a single means for supplying a fluid under pressure that is common to all the mountings. In such an assembly, all the anti-vibration mountings may be arranged to act in the same direction, for example, vertically, or different mounts may be arranged to act in different directions. Thus, some mountings, for example, the first and/or third form may be arranged to act vertically and other mountings, for example the second form may be arranged to act substantially horizontally. The mountings that act horizontally may be arranged to act in two perpendicular directions, for example, against the sides and the ends of a generally rectangular body, which, in the case of a ship's prime mover may be the platform on which the prime mover is mounted. When the fluid that is supplied to the control valve means of each mounting is a liquid, there is advantageously provided a single storage tank having an inlet in communication with the fluid escape means of the control valve means of each mounting and an outlet in communication with the means for supplying the liquid under pressure. Advantageously, there are provided two mountings or assemblies of mountings supporting the prime mover vertically, the pneumatic mount or mounts of at least one such mounting or assembly of mountings being situated on one side of a vertical plane containing the axis of the prime mover and the remaining pneumatic mount or mounts being situated on the other side of the said plane. If desired, the mountings or assemblies of mountings of which the pneumatic mounts are situated on the two sides of the said plane may be designed to take into account the fact that the torque reaction of the prime mover will increase the constant force on the pneumatic mount or mounts on one side of the said plane and decrease the constant force on the pneumatic mount or mounts or containers on the other side of the said plane.

Advantageously, in order further to attenuate noise from the prime mover, the transmission means from the prime mover to the screw or screws of the ship includes a rotary coupling as claimed in our assignors U.S. Patent No. 3,091,103.

We claim:

1. An anti-vibration mounting which comprises a variable-volume gas-filled vessel adapted to be interposed between a body and a support, a chamber, an orifice opening into said chamber through which the interior of the variable-volume vessel is in communication with the chamber, and control valve means, the said control valve means comprising a valve-chamber and a valve member movable within said valve-chamber and adapted to be moved by relative movement between the said body and the said support, the valve having a supply port for the supply of a fluid under pressure to the valve-chamber, an exhaust port for the escape of fluid from the valve-chamber and an output port through which the valve-chamber is in pressure-communication with the first mentioned chamber, and the valve member having a first range of positions in which the output port is in communication with the supply port and is blocked from the exhaust port, a second range of positions in which the output port is in communication with the exhaust port and is blocked from the supply port and a third range of positions separating the said first and second ranges in which the output port is blocked from both said ports.

2. An anti-vibration mounting as claimed in claim 1, in which the variable-volume vessel, the said chamber and the said orifice form part of a pneumatic mount adapted to be interposed between said body and said support, said mount comprising a vessel member formed with a generally cylindrical recess, a first hollow generally cylindrical member which is open at one end and has a closed end which extends generally coaxially into the said recess, a first flexible diaphragm secured to the said vessel member and to the first cylindrical member to define therewith said variable-volume vessel, a second hollow generally cylindrical member which is open at one end and has a closed end which extends coaxially into the open end of said first hollow cylindrical member, a second flexible diaphragm secured to said first and second hollow cylindrical members to define therewith said isolating chamber within the hollow interior of the first hollow cylindrical member, an orifice in the end wall of the first hollow cylindrical member providing the sole means of communication between said variable-volume vessel and said isolating chamber, and a generally cylindrical member extending coaxially within the second hollow cylindrical member and making a sliding seal therewith, while said conduit means communicates with the interior of the second hollow cylindrical member, one of said vessel member and said last-mentioned cylindrical member being secured, in operation to said body and the other to said support.

3. An anti-vibration mounting as claimed in claim 1, in which the interior of the valve chamber is generally cylindrical and the valve member is in the form of a generally cylindrical spool movable axially within the valve chamber, and recessed to provide communication, when the control valve is open, between the conduit means and one of said supply port and said exhaust port.

4. An anti-vibration mounting as claimed in claim 3, in which the spool has an intermediate portion of reduced diameter to form an annular recess.

5. An anti-vibration mounting as claimed in claim 3, in which the spool is slotted.

6. An anti-vibration mounting as claimed in claim 3, in which the wall of the valve chamber is formed with annular grooves which communicate with the supply and exhaust ports.

7. An anti-vibration mounting as claimed in claim 1, in which the variable-volume vessel comprises a bellows.

8. An anti-vibration mounting as claimed in claim 1, in which the variable-volume vessel comprises a first rigid member which forms a chamber that is open at one end, a second rigid member which extends into the chamber through the open end thereof, and a flexible diaphragm which is secured to both the rigid members and forms a seal between the rigid members to form a closed chamber.

9. An anti-vibration mounting as claimed in claim 1, in which said variable-volume vessel forms part of a double-acting pneumatic mount which also comprises an additional variable-volume gas-filled vessel, the direction of expansion of each of said variable-volume vessels being the direction of contraction of the other of said variable-volume vessels and the sum of the volumes of the two variable-volume vessels being constant, and there being provided conduit means providing communication between said additional variable-volume vessel and said valve chamber, the conduit means being blocked from said supply port and in communication with said exhaust port in the said first range of positions of said valve member, being blocked from said exhaust port and in communication with said supply port in the said second range of positions of said valve member and being blocked from both said ports in the said third range of positions of said valve member.

10. An anti-vibration mounting as claimed in claim 9, in which the pneumatic mount comprises a cylinder containing a piston, the interior of the cylinder on one side of the piston constituting one of the variable-volume vessels and the interior of the cylinder on the other side of the piston constituting the other variable-volume vessel.

11. An anti-vibration mounting as claimed in claim 9, in which in the said conduit means there is provided an additional chamber and, in series therewith, an orifice, which orifice is situated between the additional chamber and the said additional variable-volume vessel.

12. An anti-vibration mounting which comprises a variable-volume gas-filled vessel adapted to be interposed between a body and a support, a chamber, an orifice opening into said chamber through which the interior of the variable-volume vessel is in communication with the chamber, and control valve means, the said control valve means comprising a valve-chamber and a valve member movable within said valve-chamber and adapted to be moved by relative movement between the said body and the said support, the valve having a supply port for the supply of gas under pressure to the valve-chamber, an output port through which the valve-chamber is in gas-transmitting communication with the first-mentioned chamber and an exhaust port for the escape of gas from the valve-chamber, and the valve member having a first range of positions in which the output port is in communication with the supply port and is blocked from the exhaust port, a second range of positions in which the output port is in communication with the exhaust port and is blocked from the supply port and a third range of positions separating the said first and second ranges in which the output port is blocked from both said ports.

13. An anti-vibration mounting which comprises a variable-volume gas-filled vessel adapted to be interposed between a body and a support, a chamber, an orifice opening into said chamber through which the interior of the variable-volume vessel is in communication with the chamber, control valve means, the said control valve means comprising a valve-chamber and a valve member movable within said valve-chamber and adapted to be moved by relative movement between the said body and the said support, the valve having a supply port for the supply of liquid under pressure to the valve-chamber, an exhaust port for the escape of liquid from the valve-chamber and an output port through which the valve-chamber is in pressure-communication with the first-mentioned chamber, the said valve member having a first range of positions in which the output port is in communication with the supply port and is blocked from the exhaust port, a second range of positions in which the output port is in communication with the exhaust port and is blocked from the supply port and a third range of positions separating the said first and second ranges in which the output port is blocked from both said ports, and a movable barrier between the said orifice and the control valve means which movable barrier separates the said liquid from the gas.

14. An anti-vibration mounting as claimed in claim 13, in which the barrier is a flexible barrier in the form of a bag secured within the isolating element chamber, the said orifice providing communication with the region of the interior of said chamber outside said bag.

15. An anti-vibration mounting as claimed in claim 13, in which the said barrier is a movable piston.

16. An anti-vibration mounting as claimed in claim 13, in which the liquid is an oil.

References Cited by the Examiner

UNITED STATES PATENTS

| | | | |
|---|---|---|---|
| 2,235,160 | 3/1941 | Ljungstrom | 248—21 X |
| 2,605,066 | 7/1952 | Brown | 248—20 |
| 2,706,607 | 4/1955 | Withers et al. | 248—22 |
| 2,892,482 | 6/1959 | Beoletto | 248—403 |
| 2,956,761 | 10/1960 | Weber | 248—23 X |
| 2,966,124 | 12/1960 | Casey | 248—20 X |

FOREIGN PATENTS

| | | |
|---|---|---|
| 1,226,787 | 2/1960 | France. |
| 917,521 | 2/1963 | Great Britain. |

CLAUDE A. LE ROY, *Primary Examiner.*

FRANK L. ABBOTT, *Examiner.*